(12) United States Patent
Song et al.

(10) Patent No.: US 7,010,059 B2
(45) Date of Patent: Mar. 7, 2006

(54) QUADRATURE DEMODULATOR FOR COMPENSATING FOR GAIN AND PHASE IMBALANCES BETWEEN IN-PHASE AND QUADRATURE-PHASE COMPONENTS

(75) Inventors: Yun-Jeong Song, Daejeon (KR); Young-Wan Kim, Daejeon (KR); Nae-Soo Kim, Daejeon (KR); Deock-Gil Oh, Daejeon (KR)

(73) Assignee: Electronics and Telecommunications Research Institute, (KR)

( * ) Notice: Subject to any disclaimer, the term of this patent is extended or adjusted under 35 U.S.C. 154(b) by 296 days.

(21) Appl. No.: 10/406,094

(22) Filed: Apr. 2, 2003

(65) Prior Publication Data

US 2004/0066861 A1 Apr. 8, 2004

(30) Foreign Application Priority Data

Oct. 7, 2002 (KR) ...................... 10-2002-0090990

(51) Int. Cl.
*H04L 27/22* (2006.01)
(52) U.S. Cl. ...................................................... 375/316
(58) Field of Classification Search ................ 375/316, 375/326, 345, 261, 340, 329, 332, 304, 279, 375/280, 355; 455/182.1, 192.1–192.3, 232.1, 455/234.1, 193.1–193.3; 329/304
See application file for complete search history.

(56) References Cited

U.S. PATENT DOCUMENTS

| | | | |
|---|---|---|---|
| 5,705,949 A | * | 1/1998 | Alelyunas et al. .......... 329/304 |
| 5,949,821 A | | 9/1999 | Emami et al. |
| 6,009,317 A | * | 12/1999 | Wynn .......................... 455/296 |
| 6,044,112 A | | 3/2000 | Koslov |
| 6,512,800 B1 | * | 1/2003 | Amir et al. ................... 375/296 |
| 6,535,560 B1 | * | 3/2003 | Masenten ..................... 375/261 |
| 6,704,349 B1 | * | 3/2004 | Masenten ..................... 375/219 |
| 6,842,489 B1 | * | 1/2005 | Masenten ..................... 375/261 |
| 2003/0179836 A1 | * | 9/2003 | Masenten ..................... 375/316 |
| 2004/0057534 A1 | * | 3/2004 | Masenten et al. ........... 375/316 |
| 2004/0146120 A1 | * | 7/2004 | Brown ........................ 375/322 |

FOREIGN PATENT DOCUMENTS

| EP | 001363391 A1 | * 11/2003 |
|---|---|---|
| JP | 06-188928 | 7/1994 |

* cited by examiner

*Primary Examiner*—Tesfaldet Bocure
(74) *Attorney, Agent, or Firm*—Blakely Sokoloff Taylor & Zafman

(57) ABSTRACT

Disclosed is a quadrature demodulator for high-speed wireless communication, which comprises: an A/D converter for converting received signals into digital signals; a signal recovery unit for recovering carriers and symbol timing from the signals converted by the A/D converter; a decision unit for detecting recovered signals output by the signal recovery unit, and performing a decision process on them; an I/Q gain imbalance detector for detecting gain imbalances of the I and Q-phase components from the recovered signals, and outputting an I/Q gain compensation value for compensating for the gain imbalances; and an I/Q gain compensator, provided between the A/D converter and the signal recovery unit, for reflecting the I/Q gain compensation value output by the I/Q gain imbalance detector to the received signals.

8 Claims, 5 Drawing Sheets

QUADRATURE DEMODULATOR FOR COMPENSATING FOR GAIN AND PHASE IMBALANCES BETWEEN IN-PHASE AND QUADRATURE-PHASE COMPONENTS

CROSS REFERENCE TO RELATED APPLICATION

This application is based on Korea Patent Application No. 2002-60990 filed on Oct. 7, 2002 in the Korean Intellectual Property Office, the content of which is incorporated herein by reference.

BACKGROUND OF THE INVENTION (a) Field of the Invention

The present invention relates to a quadrature demodulator used for a high-speed wireless system. More specifically, the present invention relates to a quadrature demodulator for using recovered signals to detect and compensate for gain and phase imbalances between the in-phase and quadrature-phase components of complex numbers, the gain and phase imbalances being generated from the quadrature demodulator.

(b) Description of the Related Art

A high-speed wireless system receives signals through an antenna, demodulates them through an RF unit and an IF unit, and recovers the signals. Respective units for processing the signals received through the antenna perform a frequency down-converting function and a signal-amplifying function so as to obtain desired signals.

For this, the RF unit and the IF unit use various analog elements including a mixer and an amplifier. The elements satisfy predetermined standards to a certain degree, but the standards have restrictions, and the input signals are deteriorated because of incompleteness of insulation and quadrature between the elements.

The incompleteness of quadrature causing the signal deterioration frequently generates gain and phase imbalances between the I-phase and Q-phase components. The gain and phase imbalances are generated because the respective elements' insulation and signal generation do not provide a complete 90-degree phase between the I phase and the Q phase components, and they deteriorate the demodulator function of a modem for recovering signals. Hence, a method for eliminating the gain and phase imbalances between the I-phase and Q-phase components is required.

So as to remove the gain and phase imbalances between the I-phase and the Q-phase components, several methods using an RF direct conversion receiver are proposed. Among them, the U.S. Pat. No. 6,044,112 entitled "Method and apparatus for correcting amplitude and phase imbalances in demodulators" by Joshua L. Koslov, granted on Mar. 28, 2000, proposes a method for correcting the gain and phase imbalances by using a plurality of complex adders, multipliers, and counters. However, the method by Joshua L. Koslov increases complexity of realization because of using multipliers of complex numbers, and it is sensitive to noise in the case of a demodulator with noise because it is realized using simple counters. Since this method sets the gain and phase imbalances according to an increase/decrease of counts, its response speed is changed according to the increase/decrease width of the counts. The response speed does not reflect the patterns of the actual received signals, but rather it is problematically determined according to increase/decrease intervals of the counts.

Further, U.S. Pat. No. 5,949,821 entitled "Method and apparatus for correcting phase and gain imbalances between in-phase (I) and quadrature (Q) components of a received signal base on a determination of peak amplitude" by Shahriar Emami, granted on Sep. 7, 1999, discloses a method for detecting an amplitude peak of demodulated I-phase and Q-phase components, and correcting the amplitude and phase imbalances between the I-phase and Q-phase components using the amplitude peak. In this patent, one of reference I/Q-phase components is established to be a reference phase, and another one is set to be an imbalance phase to find amplitude peaks of the respective phases and obtain the phase imbalances using a sine function. The patent by Shahriar Emami uses an arcsine function to obtain the phase imbalances between the I-phase and the Q-phase components, but when realizing the function through an actual digital circuit, the circuit becomes more complex, and its realization precision is reduced.

Therefore, when attempting to detect and compensate for the gain and phase imbalances between the I-phase and the Q-phase components, an improved method for solving the complexity of circuit realization and the noise sensitivity found in the above-noted patents is required.

SUMMARY OF THE INVENTION

It is an object of the present invention to provide a quadrature demodulator for detecting gain imbalances between the I-phase and the Q-phase components from the received signals input from a quadrature demodulator device of a high-speed wireless system.

It is another object of the present invention to provide a quadrature demodulator for compensating for phase imbalances between the I-phase and the Q-phase components by using an independent automatic gain control function according to codes of received signals.

In one aspect of the present invention, a quadrature demodulator for high-speed wireless communication comprises: an A/D converter for converting received signals into digital signals; a signal recovery unit for recovering carriers and symbol timing from the signals converted by the A/D converter; a decision unit for detecting recovered signals output by the signal recovery unit, and performing a decision process on them; an I/Q gain imbalance detector for detecting gain imbalances of the I and Q-phase components from the recovered signals, and outputting an I/Q gain compensation value for compensating for the gain imbalances; and an I/Q gain compensator, provided between the A/D converter and the signal recovery unit, for reflecting the I/Q gain compensation value output by the I/Q gain imbalance detector to the received signals.

The I/Q gain imbalance detector comprises: an absolute value operator for performing an absolute value operation on the respective I-phase and Q-phase components output by the signal recovery unit; a mean value operator for performing a mean value operation on the respective I-phase and Q-phase components output by the absolute value operator; and a division operator for performing a division operation for dividing an I-phase mean value output provided by the mean value operator by a Q-phase mean value output, and outputting a result to the I/Q gain compensator.

In another aspect of the present invention, a quadrature demodulator for high-speed wireless communication comprises: an A/D converter for converting received signals into digital signals; a signal recovery unit for recovering carriers and symbol timing from the signals converted by the A/D converter; a decision unit for detecting recovered signals output by the signal recovery unit, and performing a decision process on them; an I/Q phase imbalance detector for applying a signal value difference between the recovery signal and a signal output by the decision unit to the respective I and Q-phase components according to a code of the recovery signal to detect phase imbalances between the I and Q-phase components, and outputting an I/Q phase compensation value for compensating for the phase imbalances; and an I/Q gain compensator, provided between the A/D converter and the signal recovery unit, for reflecting the I/Q phase compensation value output by the I/Q phase imbalance detector to the received signals.

The I/Q phase imbalance detector independently performs an AGC (automatic gain control) operation according to the code of the recovery signal to recognize the phase imbalance between the I-phase and the Q-phase components as a signal value difference format depending on the code of the recovery signal.

The I/Q phase imbalance detector comprises: a first code determiner for determining the code for the recovery signal and outputting a selection signal; a demultiplexer for determining an output position of the recovery signal according to the selection signal output by the first code determiner, and outputting the output position; an automatic gain controller for performing an AGC operation on the signal output by the demultiplexer according to the code of the recovery signal; a second code determiner for determining the code of the received signal and outputting a selection signal; a time delay unit for delaying the selection signal output by the second code determiner by a time when the automatic gain controller performs the AGC operation; and a multiplexer for combining the signals output from the automatic gain controller, multiplexing them according to the signal output by the time delay unit, and outputting result signals to the I/Q phase compensator.

The I/Q phase compensator comprises: a time delay unit for delaying and outputting the time of the recovery signal; and a multiplier for multiplying the signal output from the time delay unit by an I/Q phase compensation value output from the I/Q phase imbalance detector.

In still another aspect of the present invention, a quadrature demodulator for high-speed wireless communication comprises: an A/D converter for converting received signals into digital signals; a signal recovery unit for recovering carriers and symbol timing from the signals converted by the A/D converter; a decision unit for detecting and determining the recovery signals output by the signal recovery unit; an I/Q gain imbalance detector for detecting gain imbalances of the I and Q-phase components from the recovery signal, and outputting an I/Q gain compensation value for compensating for the gain imbalance; an I/Q phase imbalance detector for applying a signal value difference between the recovery signal and a signal output by the decision unit to the respective I and Q-phase components according to a code of the recovery signal to detect phase imbalances between the I and Q-phase components, and outputting an I/Q phase compensation value for compensating for the phase imbalances; an I/Q gain compensator, provided between the A/D converter and the signal recovery unit, for reflecting the I/Q gain compensation value output by the I/Q gain imbalance detector to the received signals; and an I/Q gain compensator, provided between the I/Q gain compensator and the signal recovery unit, for reflecting the I/Q phase compensation value output by the I/Q phase imbalance detector to the received signals.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
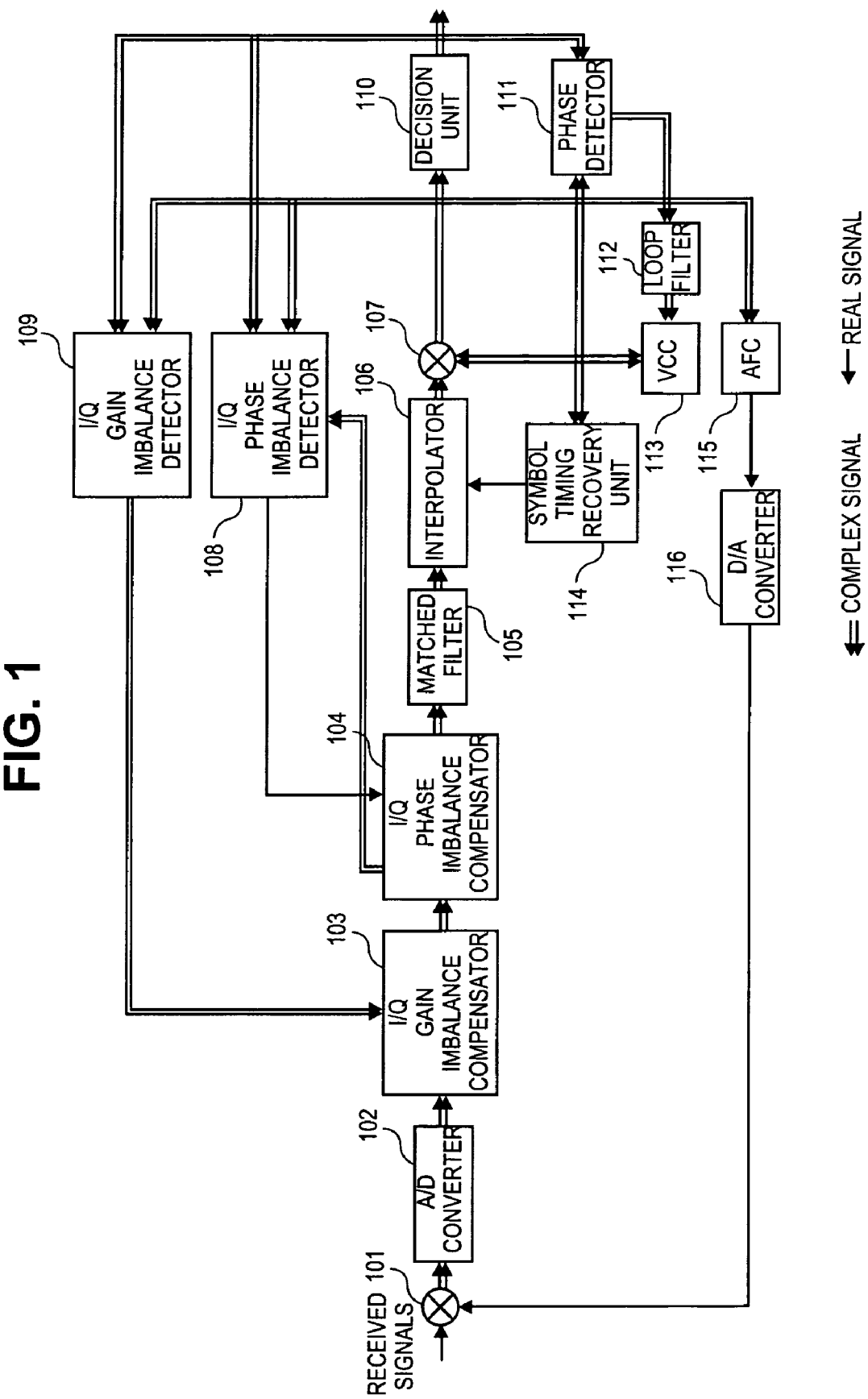
FIG. 1 shows a configuration of a quadrature demodulator for realizing a function for compensating for gain and phase imbalances between the I-phase and the Q-phase components according to a preferred embodiment of the present invention.

FIG. 1 shows a configuration of a quadrature demodulation receiver for realizing a function for compensating for gain and phase imbalances between the I-phase and the Q-phase components according to a preferred embodiment of the present invention.

As shown, the quadrature demodulation receiver comprises: a complex multiplier 101 for receiving received signals (complex signals generated through an antenna, an RF unit, an IF unit, and a quadrature converter (all not illustrated)) and output signals of a D/A converter 116; an A/D converter 102 for receiving signals from the complex multiplier 101; an I/Q gain compensator 103 for receiving signals from the A/D converter 102 and an I/Q gain imbalance detector 109; an I/Q phase compensator 104 for receiving signals from the I/Q gain compensator 103 and an AGC (an I/Q phase imbalance detector) 108; a matched filter 105 for receiving signals from the I/Q phase compensator 104; an interpolator 106 for receiving signals from the matched filter 105 and a symbol timing recovery unit 114; a complex multiplier 107 for receiving signals from the interpolator 106 and an NCO (numerical controlled oscillator) 113 for performing a function of a VCO (voltage controlled oscillator) of an analog circuit in a digital circuit; a decision unit 110 for receiving signals from the complex multiplier 107; an AGC (an I/Q phase imbalance detector) 108 for receiving signals from the complex multiplier 107 and the decision unit 110; an I/Q gain imbalance detector 109 for receiving signals from the complex multiplier 107 and the decision unit 110; a phase detector 111 for receiving signals from the complex multiplier 107 and the decision unit 110; a loop filter 112 for receiving signals from the phase detector 111;

an NCO 113 for receiving signals from the loop filter 112; a symbol timing recovery unit 114 for receiving signals from the complex multiplier 107; an AFC (automatic frequency controller) 115 for receiving signals from the complex multiplier 107; and a D/A converter 116 for receiving signals from the AFC 115.

Figure 3:
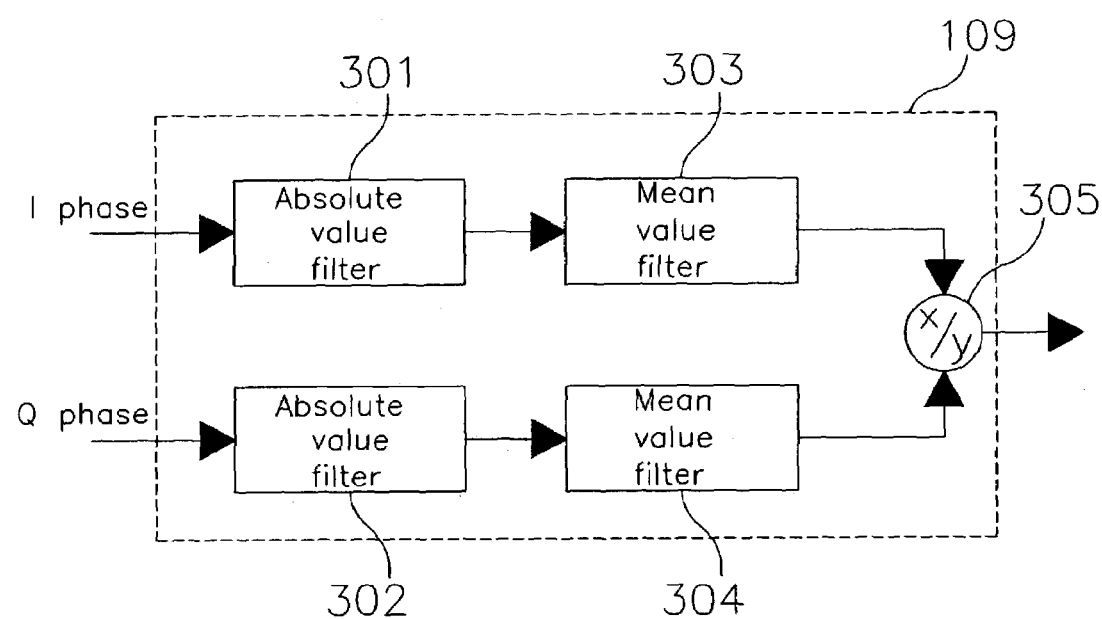
FIG. 3 shows a detailed block diagram of an I/Q gain imbalance detector shown in FIG. 1.

FIG. 3 shows a detailed block diagram of the I/Q gain imbalance detector 109 shown in FIG. 1.

As shown, the I/Q gain imbalance detector 109 comprises: absolute value operators 301 and 302 for receiving signals r(k), that is, outputs of I-phase and the Q-phase components from the complex multiplier 107; mean value filters 303 and 304 for receiving signals from the absolute value operators 301 and 302; and a division operator 305 for dividing an output of the mean value filter 303 of the I-phase component by an output of the mean value filter 304 of the Q-phase component.

Figure 5:
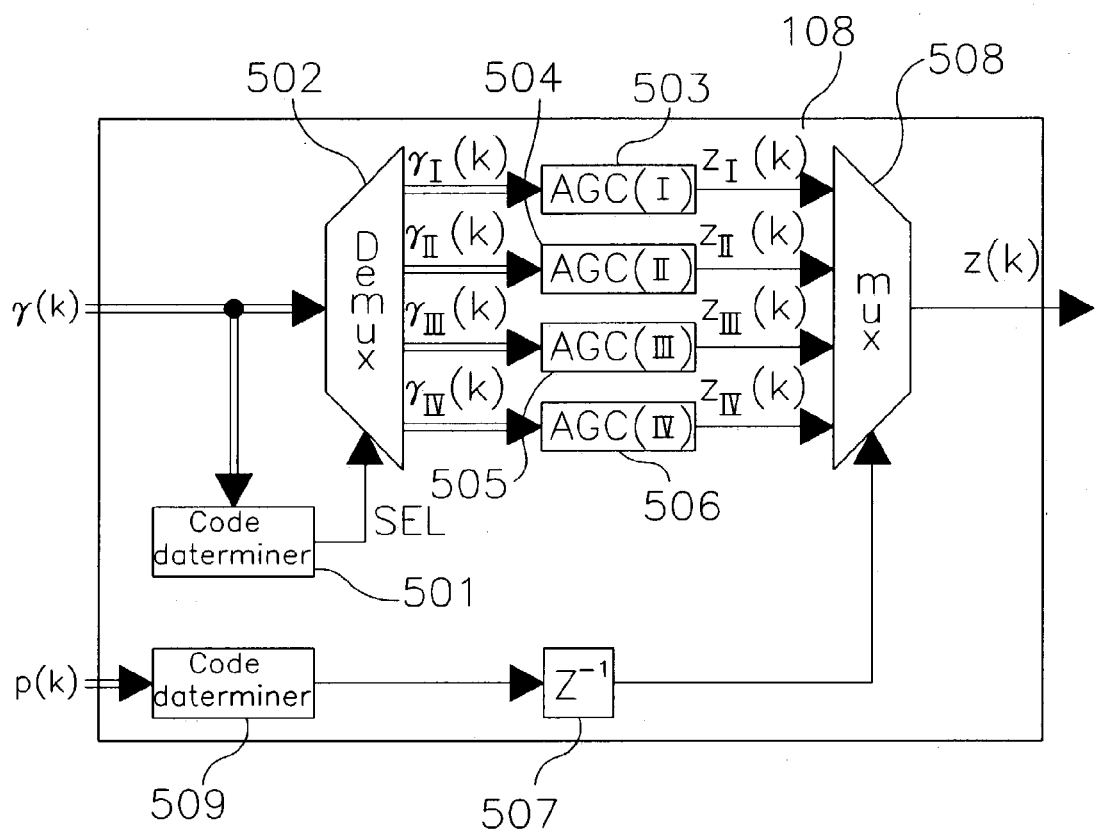
FIG. 5 shows a detailed block diagram of an AGC (an automatic gain controller; i.e., an I/Q phase imbalance detector) shown in FIG. 1.

FIG. 5 shows a detailed block diagram of the AGC (the I/Q phase imbalance detector) 108 shown in FIG. 1.

As shown, the AGC (the I/Q phase imbalance detector) 108 comprises: a code determiner 501 for receiving the signals r(k) from the complex multiplier 107; a demultiplexer 502 for receiving the signals r(k) from the complex multiplier 107 and a signal SEL from the code determiner 501; an AGC(I) 503 for receiving a signal $\gamma_I(k)$ from the demultiplexer 502; an AGC(II) 504 for receiving a signal $\gamma_{II}(k)$ from the demultiplexer 502; an AGC(III) 505 for receiving a signal $\gamma_{III}(k)$ from the demultiplexer 502; an AGC(IV) 506 for receiving a signal $\gamma_{IV}(k)$ from the demultiplexer 502; a code determiner 509 for receiving signals p(k); a time delay unit $z^{-1}$ 507 for receiving a signal from the code determiner 509; and a multiplexer 508 for receiving a signal $z_I(k)$ from the AGC(1) 503, a signal $z_{II}(k)$ from the AGC(II) 504, a signal $z_{III}(k)$ from the AGC(III) 505, and a signal $z_{IV}(k)$ from the AGC(IV) 506.

Figure 6:
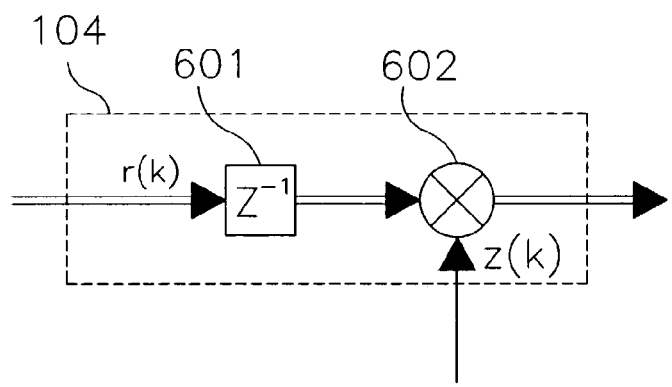
FIG. 6 shows a detailed block diagram of an I/Q phase compensator shown in FIG. 1.

FIG. 6 shows a detailed block diagram of an I/Q phase compensator shown in FIG. 1.

As shown, the I/Q phase compensator 104 comprises: a time delay unit $z^{-1}$ 601 for receiving signals r(k) from the I/Q gain compensator 103; and a complex multiplier 602 for receiving signals from the time delay unit 601 and a signal z(k) from the AGC (the I/Q phase imbalance detector) 108.

An operation of the quadrature demodulation receiver for implementing a function of compensating for gain and phase imbalances between the I-phase and the Q-phase components will now be described.

Signals input through an antenna (not illustrated) and processed through an RF and IF unit (not illustrated) are passed through a quadrature converter (not illustrated) to be generated into complex signals (received signals). The complex multiplier 101 multiplies the complex numbers (received signals) by analog signals output by the AFC 115 and converted by the D/A converter 116 to perform a carrier frequency offset compensation on them, and the A/D converter 102 converts the compensated signals into digital signals.

The I/Q gain compensator 103 for receiving an I/Q gain imbalance compensation value from the I/Q gain imbalance detector 109 compensates for the digitally converted signals' gain imbalances between the I-phase and the Q-phase components, and outputs compensated signals.

The I/Q phase compensator 104 for receiving an I/Q phase imbalance compensation value from the phase AGC (the I/Q phase imbalance detector) 108 compensates for the I/Q gain imbalance compensated signals' phase imbalances between the I-phase and the Q-phase components, and outputs result signals.

The matched filter 105 performs matched filtering on the I/Q phase imbalance compensated signals, and outputs result signals, and the matched filtered signals are interpolated according to a symbol timing correction value provided by the symbol timing recovery unit 114 and are then output.

A carrier loop including the complex multiplier 107, the phase detector 111, the loop filter 112, and the NCO 113 performs carrier recovery on the interpolated signals.

In detail, the complex multiplier 107 multiplies the interpolated signals by the output signals of the NCO 113 and outputs result signals, the phase detector 111 receives a signal from the complex multiplier 107 and a signal from the determiner 110 to detect a phase difference between the two signals, the loop filter 112 obtains a mean value of an output signal of the phase detector 111, and the NCO 113 provides an oscillation output corresponding to the mean value output by the loop filter 112 to the complex multiplier 107.

The determiner 110 determines the signals recovered by the carrier loop to thereby extract them as symbol values.

The I/Q gain imbalance detector 109 detects gain imbalances between the I/Q phase components from the recovered signals.

When an input signal is set to be r(t) and a corresponding sample value at the time t=kT is set to be r(k) so as to obtain the gain imbalances, the mean of the absolute value of the I-phase and the Q-phase components is defined to be c(k)= E[|r(k)|].

In this instance, the absolute value operators 301 and 302 respectively operate the absolute values of the I-phase and the Q-phase components of the input signals r(k).

The mean value filter 303 performs a mean value operation on the I-phase signal |r(k)| output from the absolute value operator 301, and the mean value filter 304 performs a mean value operation on the Q-phase signal |r(k)| output from the absolute value operator 302.

The division operator 305 performs a division operation for dividing an I-phase mean value filter output provided by the mean value filter 303 by a Q-phase filter output provided by the mean value filter 304 to detect gain imbalances, and outputs the gain imbalances as a gain imbalance compensation value between the I/Q-phase components.

The gain imbalance compensation value between the I/Q-phase components detected from the recovered signals is transmitted to the I/Q gain imbalance compensator 103, and the I/Q gain imbalance compensator 103 multiplies the I-phase component by the I/Q gain imbalance compensation value to solve the gain imbalances of the signals output from the A/D converter 102, the gain imbalances being between the I-phase and the Q-phase components.

The I/Q phase imbalance detector 108 detects the phase imbalance between the I/Q-phase components of the recovered signals r(k).

Figure 2:
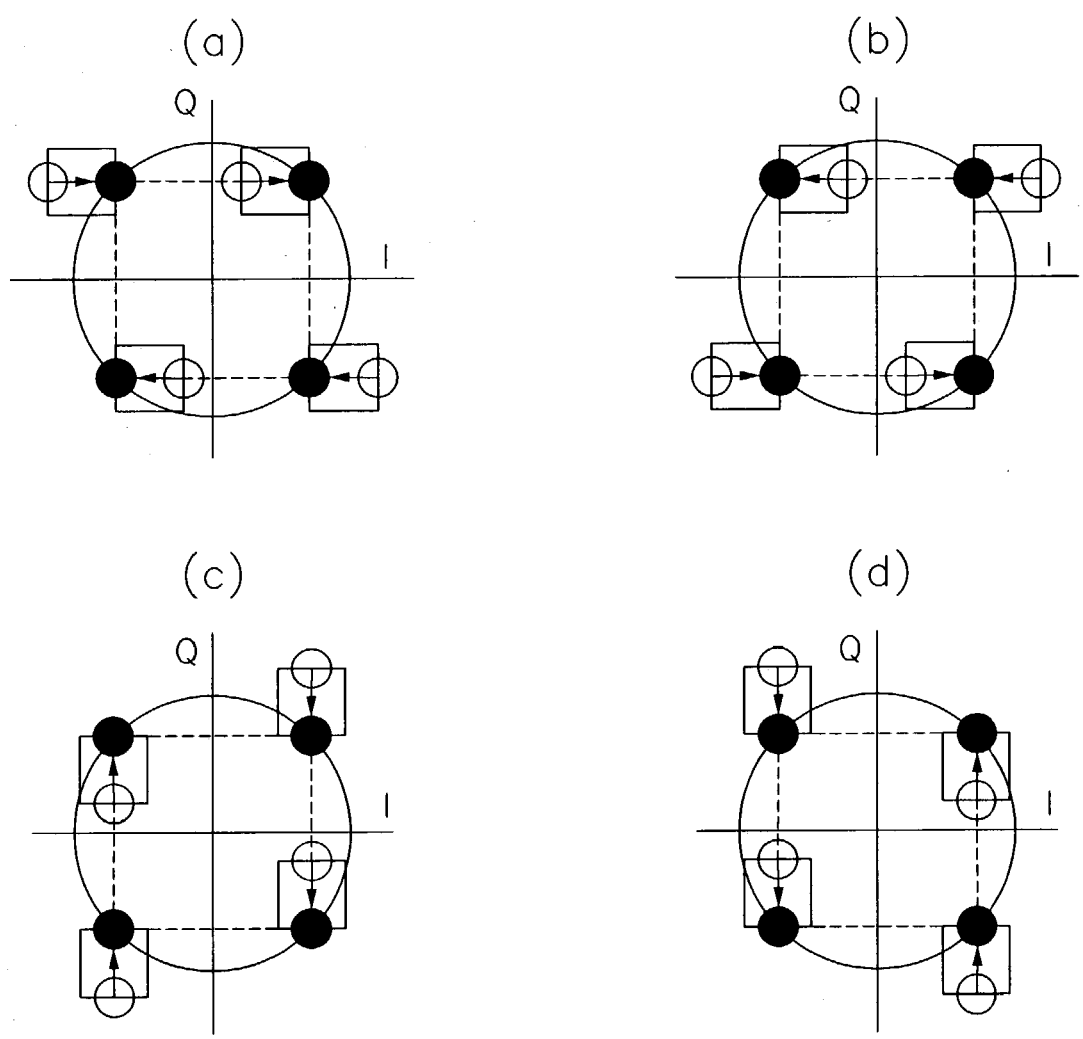
FIG. 2 shows an I/Q constellation diagram having phase imbalances between the I-phase and the Q-phase components.
Figure 4:
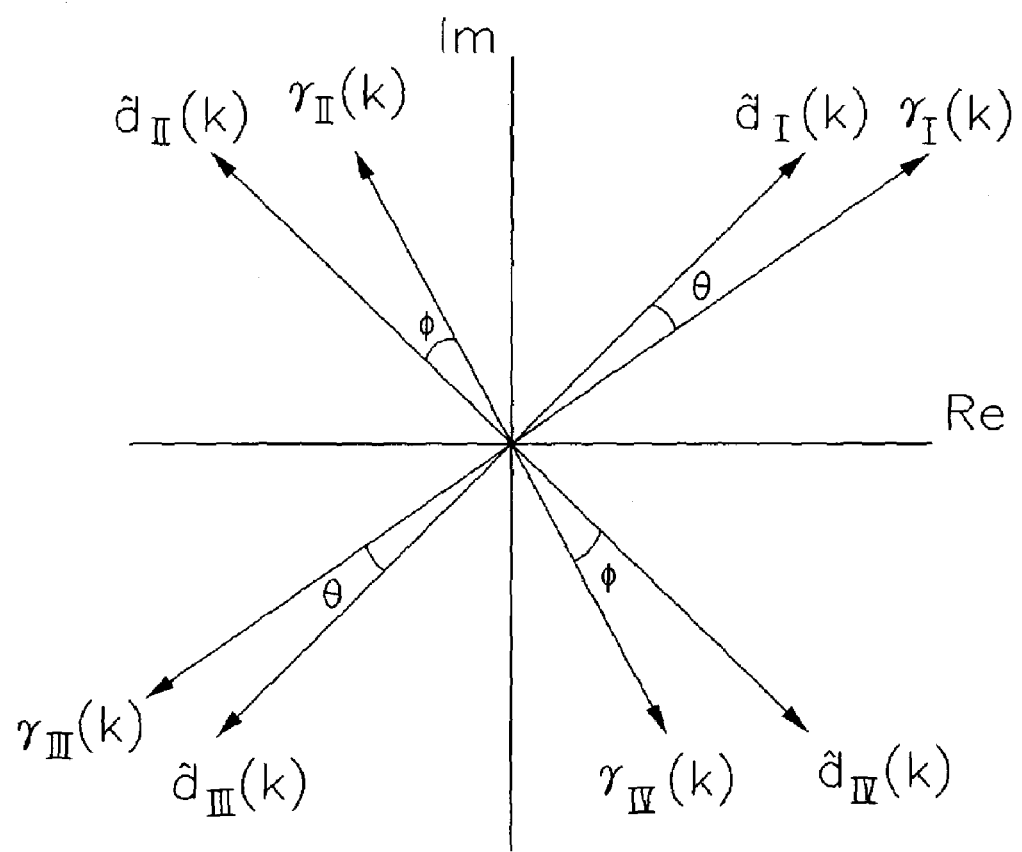
FIG. 4 shows an I/Q constellation diagram for showing differences of signal values according to the phase imbalances between the I-phase and the Q-phase components.

FIG. 2 shows an I/Q constellation diagram having phase imbalances between the I-phase and the Q-phase components, and FIG. 4 shows an I/Q constellation diagram for showing differences of signal values according to the phase imbalances between the I-phase and the Q-phase components.

Black circles in FIG. 2 indicate positions of desired recovered signals, and white circles show signals generated because of imbalances between the I/Q-phase components.

FIGS. 2(a) and 2(b) show phase imbalances of the Q-phase component with reference to the I-phase component, and FIGS. 2(c) and 2(d) show phase imbalances of the I-phase component with reference to the Q-phase component.

Referring to FIG. 4, the phase imbalance between the I/Q-phase components is recognized as a signal value difference between the recovered signal r(k) of the received signal and a code of the I and Q phases of a determination signal d(k).

The I/Q phase imbalance detector 108 separately provides the AGC function applied according to the code of the recovered signal r(k), thereby recognizing the phase imbalance as a signal difference format according to the code, and compensates for the same.

For example, when the I and Q codes of the recovered signals are all positive, that is, in the case the recovered signals are positioned in the first quadrant of FIG. 4, an output of the selection signal becomes 00, the demultiplexer 502 outputs the recovered signal as $\gamma_I(k)$ according to the output, and the AGC(I) 503 performs an AGC operation on the signal.

Therefore, the AGC operation may be independently performed according to the code of the recovered signal r(k).

As shown in FIG. 4, the AGC(I) 503, the AGC(II) 504, the AGC(III) 505, and the AGC(IV) 506 separately perform the AGC operation according to the codes of the recovered signals, and perform the AGC function with reference to the determination signal d(k) to detect I/Q phase imbalance compensation values of the recovered signals, and respectively output them to $z_I(k)$, $z_{II}(k)$, $z_{III}(k)$, and $z_{IV}(k)$.

The time delay unit 507 delays the output signal SEL of the code determiner 509 by one step and outputs it to the multiplexer 508 while the AGC(I) 503, the AGC(II) 504, the AGC(III) 505, and the AGC(IV) 506 respectively performs the AGC operation.

The multiplexer 508 combines the signals $z_I(k)$, $z_{II}(k)$, $z_{III}(k)$, and $z_{IV}(k)$ respectively output from the AGC(I) 503, the AGC(II) 504, the AGC(III) 505, and the AGC(IV) 506, and outputs an I/Q phase imbalance compensation value z(k) to the I/Q phase compensator 104.

The I/Q phase compensator 104 applies the I/Q phase imbalance compensation value z(k) output by the AGC (the I/Q phase imbalance detector) 108 to the signal output by the I/Q gain compensator 103 to compensate for the phase imbalances between the I-phase and the Q-phase components.

In detail, the time delay unit 601 delays the signal r(k) output by the I/Q gain compensator 103 by one step and outputs the same, and the complex multiplier 602 multiplies the signal output by the time delay unit 601 by the I/Q phase imbalance compensation value z(k) to output an I/Q phase imbalance compensated signal to the matched filter 105.

The present invention detects imbalances between the I and Q-phase components and corrects them to prevent a demodulator's bad performance caused by imbalances between the I and Q-phase components.

Also, a signal value difference between a received signal and a determination signal that is a desired signal is respectively applied to the I-phase and the Q-phase components to compensate for the gain imbalances between the I-phase and the Q-phase components, the phase imbalance of the received signal is recognized as a signal value modification to separately provide the AGC operation according to the code of the received signal, correct the signal value of the determination signal, and thereby correct the I/Q phase imbalances without detecting the phase imbalance between the I-phase and the Q-phase components, and accordingly, the present invention may be more applicable to high-speed wireless communication.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A quadrature demodulator for high-speed wireless communication, comprising:
   an A/D converter for converting a received signals into a digital signal;
   a signal recovery unit for recovering carriers and symbol timing from the signal converted by the A/D converter and outputting a recovered signal;
   a decision unit for detecting the recovered signal output by the signal recovery unit, and performing a decision process on the recovered signal;
   an I/Q gain imbalance detector for detecting gain imbalances of I and Q-phase components from the recovered signal, wherein the I/Q gain imbalance detector computes a ratio of the I and Q-phase components to generate an output of an I/Q gain compensation value for compensating for the gain imbalances; and
   an I/Q gain compensator, disposed between the A/D converter and the signal recovery unit, for reflecting the I/Q gain compensation value output by the I/Q gain imbalance detector to the received signal.

2. The quadrature demodulator of claim 1, wherein the I/Q gain imbalance detector comprises:
   an absolute value operator for performing an absolute value operation on the respective I-phase and the Q-phase components output by the signal recovery unit;
   a mean value operator for performing a mean value operation on the respective I-phase and the Q-phase components output by the absolute value operator; and
   a division operator for performing a division operation for dividing an I-phase mean value output provided by the mean value operator by a Q-phase mean value output, and outputting a result to the I/Q gain compensator.

3. A quadrature demodulator for high-speed wireless communication, comprising:
   an A/D converter for converting a received signal into a digital signal;
   a signal recovery unit for recovering carriers and symbol timing from the signal converted by the A/D converter and outputting a recovered signal;
   a decision unit for detecting the recovered signal output by the signal recovery unit, and performing a decision process on the recovered signal;
   an I/Q phase imbalance detector for applying a signal value difference between the recovered signal and a signal output by the decision unit to the respective I and Q-phase components by performing an AGC (automatic gain control) operation according to a code of the recovered signal to detect phase imbalances between the I and Q-phase components, and outputting an I/Q phase compensation value for compensating for the phase imbalances; and
   an I/Q phase compensator, provided between the A/D converter and the signal recovery unit, for reflecting the I/Q phase compensation value output by the I/Q phase imbalance detector to the received signal.

4. The quadrature demodulator of claim 3, wherein the I/Q phase imbalance detector independently performs the AGC (automatic gain control) operation according to the code of the recovered signal to recognize the phase imbalance between the I-phase and the Q-phase components as a signal value difference format depending on the code of the recovered signal.

5. The quadrature demodulator of claim 3, wherein the I/Q phase imbalance detector comprises:
- a first code determiner for determining the code for the recovered signal and outputting a first selection signal;
- a demultiplexer for determining an output position of the recovered signal according to the first selection signal and outputting the output position;
- an automatic gain controller for performing the AGC operation on the signal output by the demultiplexer according to the code of the recovered signal;
- a second code determiner for determining the code of the received signal and outputting a second selection signal;
- a time delay unit for delaying the second selection signal by a time when the automatic gain controller performs the AGC operation; and
- a multiplexer for combining the signals output from the automatic gain controller, multiplexing the signals output from the automatic gain controller according to the signal output by the time delay unit, and outputting result signals to the I/Q phase compensator.

6. The quadrature demodulator of claim 5, wherein the code of the recovered signal has four categories according to the code of the I and Q phases, and the demultiplexer outputs the recovered signal as one of four outputs according to the first selection signal, and the automatic gain controller comprises four AGC modules for respectively performing AGC operations on the four outputs output by the demultiplexer.

7. The quadrature demodulator of claim 3, wherein the I/Q phase compensator comprises:
- a time delay unit for delaying and outputting the time of the recovered signal; and
- a multiplier for multiplying the signal output from the time delay unit by an I/Q phase compensation value output from the I/Q phase imbalance detector.

8. A quadrature demodulator for high-speed wireless communication, comprising:
- an A/D converter for converting a received signal into a digital signal;
- a signal recovery unit for recovering carriers and symbol timing from the signal converted by the AID converter and outputting a recovered signal;
- a decision unit for detecting and determining the recovered signal output by the signal recovery unit;
- an I/Q gain imbalance detector for detecting gain imbalances of the I and Q-phase components from the recovered signal, wherein the I/Q gain imbalance detector computes a ratio of the I and Q-phase components to generate an output of an I/Q gain compensation value for compensating for the gain imbalance;
- an I/Q phase imbalance detector for applying a signal value difference between the recovered signal and a signal output by the decision unit to the respective I and Q-phase components according to a code of the recovered signal to detect phase imbalances between the I and Q-phase components, and outputting an I/Q phase compensation value for compensating for the phase imbalances;
- an I/Q gain compensator, provided between the A/D converter and the signal recovery unit, for reflecting the I/Q gain compensation value output by the I/Q gain imbalance detector to the received signal; and
- an I/Q phase compensator, provided between the I/Q gain compensator and the signal recovery unit, for reflecting the I/Q phase compensation value output by the I/Q phase imbalance detector to the received signal.

\* \* \* \* \*